United States Patent
Tatsuura et al.

(10) Patent No.: US 7,463,400 B1
(45) Date of Patent: Dec. 9, 2008

(54) ELECTROCHROMIC DISPLAY DEVICE

(75) Inventors: Satoshi Tatsuura, Kanagawa (JP);
Yasuhiro Yamaguchi, Kanagawa (JP);
Yasuo Yamamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 258 days.

(21) Appl. No.: 11/502,279

(22) Filed: Aug. 10, 2006

(30) Foreign Application Priority Data

Feb. 13, 2006 (JP) ............................. 2006-035691

(51) Int. Cl.
*G02F 1/153* (2006.01)
(52) U.S. Cl. ....................................... 359/273; 359/265
(58) Field of Classification Search ......... 359/265–275; 345/49, 105; 348/817; 252/586
See application file for complete search history.

(56) References Cited

U.S. PATENT DOCUMENTS 6,426,827 B1 * 7/2002 Bonhote et al. ............. 359/265

FOREIGN PATENT DOCUMENTS

| JP | 2001-519922 | 10/2001 |
|---|---|---|
| JP | 2004-151265 | 5/2004 |
| WO | 98/44384 | 10/1998 |

OTHER PUBLICATIONS

J. Phys. Chem B vol. 104, pp. 11449-11459 (2000).

* cited by examiner

*Primary Examiner*—Hung X Dang
*Assistant Examiner*—Joseph Martinez
(74) *Attorney, Agent, or Firm*—Fildes & Outland, P.C.

(57) ABSTRACT

The invention provides an electrochromic display device having at least a pair of substrate electrodes and an electrolyte solution interposed between the pair of substrate electrodes. One substrate electrode of the pair of substrate electrodes has a porous structure on its surface. A monomolecular film formed of a first molecule that has a functional group that is capable of adsorbing to the porous structure is adsorbed to the porous structure via the functional group of the first molecule. A monomolecular film of a second molecule that has a functional group that is capable of chemically bonding to the first molecule is provided on the monomolecular film formed of the first molecule via a chemical bond between the functional group of the first molecule and the functional group of the second molecule. Further, at least one of the first molecule and the second molecule is an electrochromic dye.

9 Claims, 1 Drawing Sheet

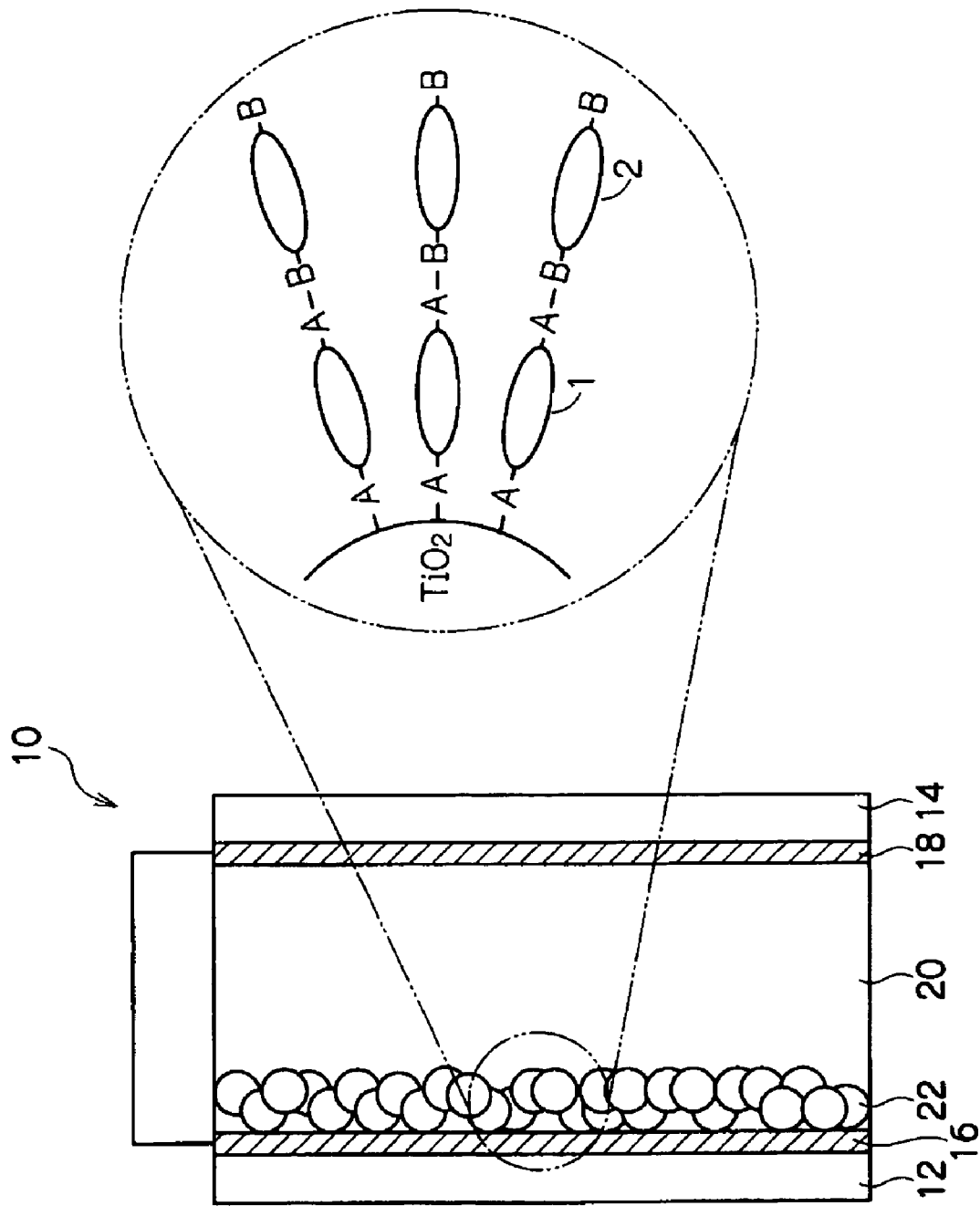

ELECTROCHROMIC DISPLAY DEVICE

BACKGROUND

1. Technical Field

The invention relates to an electrochromic display device, and more particularly, to an electrochromic display device capable of multicolor display.

2. Related Art

Graetzel electrochromic display (ECD) is known as one of the potential techniques for electronic paper. The Graetzel ECD has advantages such as high contrast and rapid response. However, in conventional ECD, only one type of molecule is adsorbed to titanium oxide, and thus color change has been limited to one color associated with the color development and decoloring of the molecule.

As a method for colorization of ECD, for example, a method of using color filters, or a method of placing or laminating three color ECD devices together is suggested. However, these methods can cause deterioration of reflectivity and increase in cost.

Moreover, the type of usable dye molecules is limited because dye molecules used in ECD preferably have a plurality of carboxyl groups, phosphate groups or the like to serve as porous semiconductors having adequate bond strength to titanium oxide. This limitation is applicable not only to dye molecules, but to other various molecules to be adsorbed to a porous structure.

SUMMARY

According to an aspect of the invention, an electrochromic display device comprises a pair of substrate electrodes; and an electrolyte solution interposed between the pair of substrate electrodes, wherein:

one substrate electrode of the pair of substrate electrodes has a porous structure on its surface;

a monomolecular film formed of a first molecule that has a functional group that is capable of adsorbing to the porous structure is adsorbed to the porous structure via the functional group of the first molecule;

a monomolecular film of a second molecule that has a functional group that is capable of chemically bonding to the first molecule is provided on the monomolecular film formed of the first molecule via a chemical bond between the functional group of the first molecule and the functional group of the second molecule; and at least one of the first molecule and the second molecule is an electrochromic dye.

BRIEF DESCRIPTION OF THE DRAWING

Exemplary embodiment of the present invention will be described in detail based on the following FIGURE, wherein:

FIG. 1 is a schematic view showing the electrochromic display device of the invention.

DETAILED DESCRIPTION

The electrochromic display device of the invention comprises, according to one aspect of the invention, at least a pair of substrate electrodes and an electrolyte solution interposed between the pair of substrate electrodes. One substrate electrode of the pair of substrate electrodes is a substrate electrode having a porous structure on its surface. At least a monomolecular film of a first molecule having a functional group capable of adsorbing to the porous structure adsorbs to the porous structure through the functional group. Further, a monomolecular film of a second molecule having a functional group capable of chemically bonding to the functional group of the first molecule is provided on the monomolecular film of the first molecule in such a manner that the functional groups are chemically bonded to each other.

The electrochromic display device of the invention comprises, according to another aspect of the invention, at least a pair of substrate electrodes and an electrolyte solution interposed between the pair of substrate electrodes. One substrate electrode of the pair of substrate electrodes is a substrate electrode which has a porous structure on its surface. The electrochromic display device comprises at least a first electrochromic dye which has a functional group capable of adsorbing to the porous structure and adsorbs to the porous structure through the functional group, and a second electrochromic dye which has a functional group capable of bonding with the first electrochromic dye and bonds to the first electrochromic dye through the functional group.

The electrochromic display device of the invention comprises, according to still another aspect of the invention, at least a pair of substrate electrodes and an electrolyte solution interposed between the pair of substrate electrodes. One substrate electrode of the pair of substrate electrodes is a substrate electrode having a porous structure on its surface. A compound having a functional group capable of adsorbing to the porous structure is disposed in the porous structure through the functional group in such a manner that the compound is chemically combined with a fourth electrochromic dye or forms a clathrate with the fourth electrochromic dye.

In the first described aspect, the kind of the molecules adsorbed to the porous structure is not particularly limited, and examples thereof include aliphatic or aromatic hydrocarbons having —COOH, —OH, —PO(OH)$_2$, or —COCl at a terminal thereof. In the second described aspect, the molecule adsorbed to the porous structure is an electrochromic dye, and the dye itself has an functional group. In the third described aspect, an electrochromic dye is bonded with (included in) the porous structure through other compounds.

The electrochromic display device of the invention is further described in detail below.

First, the adsorption of the bonding functional group to the porous structure, and the bonding between the bonding functional groups are described.

Four bonding functional groups are respectively designated as groups A, B, C, and D, with the proviso that the group A is capable of adsorbing to the porous structure, and the group A bonds with the group B, the group B bonds with the group C, and the group C bonds with the group D. In an ECD device (electrochromic display device) having a porous semiconductor layer, a molecule containing a plurality of the group A is adsorbed to the porous semiconductor layer. Then, a molecule containing a plurality of the group B is bonded with the group A adsorbed to the porous semiconductor layer. Subsequently, a molecule containing the group C, and a molecule containing the group D are sequentially adsorbed in the same manner. Thus, plural molecules are fixed to the surface of the semiconductor without reducing the number of molecules per unit area. In this instance, the groups C and A may be the same, and the groups D and B may be the same.

For example, when the first electrochromic dye has the functional group A, the second electrochromic dye has the functional group B, and the third electrochromic dye has the functional group C, the first electrochromic dye bonds with the second electrochromic dye through the functional groups A and B, and the second electrochromic dye bonds with the third electrochromic dye through the functional groups B and C. In this instance, three dyes are bonded together through the functional groups, and four or more dyes can be bonded together by bonding through appropriately selected functional groups.

Examples of the combination of the functional groups include combinations in which the first molecule (the first electrochromic dye in the second aspect) contains the groups A and C, and the second molecule (the second electrochromic dye in the second aspect) contains the groups D and F.

As described above, in the invention, a molecule in which introduction of a functional group is difficult can be adsorbed by utilizing a molecule (electrochromic dye) selected in view of having a linking group capable of adsorbing to the porous structure and bonding with a desired molecule (electrochromic dye). When the adsorption of another molecule to a single adsorbed molecular layer is repeated, the number of adsorbed molecules for one color is not decreased. Thus, the use of a plurality of pH indicators or the like which cause various color changes can enhance the efficiency for light utilization in a reflective display, and can achieve multicolor display in a single pixel.

When titanium oxide is used as the porous semiconductor, an example of the functional group A is a phosphate, and as the first layer molecule (first electrochromic dye), viologen phosphate, which is common for Graetzel ECD, can be used. To the ECD, a molecule having a plurality of hydroxyl groups can be adsorbed as the second molecule (second electrochromic dye). In this instance, when the second molecule (second electrochromic dye) exhibits electrochromism different from that of viologen (e.g., coloring occurs in an oxidized state and decoloring occurs in a reduced state), multicolor display in a single pixel is achieved. As the second molecule (second electrochromic dye), pH indicators or the like can be used with no chemical modification. Finer multicolor display is achieved by increasing the number of layers (e.g., adding the third and fourth layers), or using dyes whose color tone continuously changes.

The color change of the molecules in the second and following layers can be caused by directly injecting electrons; however it is more practical to locally change the pH in the electrolyte in the vicinity of the electrode, and transmit the pH change to the molecules to cause color change.

The configuration of the electrochromic display device of the invention will be explained below with reference to the drawing. FIG. 1 is a schematic view showing the electrochromic display device of the invention. In an electrochromic display device 10 shown in the left half of FIG. 1, a pair of substrate electrodes 16, 18, each formed on glass substrates 12, 14, are electrically connected to each other, and an electrolyte solution 20 is interposed between the substrate electrodes 16 and 18. A titanium oxide layer 22 is formed on the surface of the substrate electrode 16, which is one of the pair of substrate electrodes, opposing the substrate electrode 18 to form a porous structure. The substrate electrode 16 is an ITO electrode.

The balloon in the right half of FIG. 1 schematically shows an enlarged view of the surface of the titanium oxide layer 22 shown in FIG. 1. Functional group A is capable of adsorbing to the porous structure, and is a functional group capable of chemically bonding with functional group B. More specifically, molecule 1 (first molecule) having the functional group A adsorbs to the porous structure and bonds with molecule 2 (second molecule) having the functional group B. Although not shown, the molecule 2 is further capable of bonding with a molecule having a functional group capable of bonding with the functional group B. When electrochromic dyes which have different oxidation reduction potentials and cause different modes of coloring and decoloring are used as such molecules, multicolor display is achieved without reducing the number of adsorbed molecules per unit area.

In the configuration as shown in the above FIG. 1, for example, when the molecules 1 and 2 have the following electrochromisms of:

Molecule 1: conversion to negative: blue, conversion to positive: colorless; and Molecule 2: conversion to negative: colorless, conversion to positive: red, upon application of a voltage to the titanium oxide layer which converts voltages from negative to positive, the color changes from blue to colorless (white) to red. More specifically, the display of two colors, blue and red, can be achieved by converting a voltage applied to an electrochromic display device having the configuration as shown in FIG. 1.

The constituents of the electrochromic display device of the invention are further described below.

Substrate Electrode

First, the pair of substrate electrodes disposed in opposition to each other in the electrochromic display device of the invention will be described.

As the substrate electrodes in the invention, a plate-shaped body having electrical conductivity (conductive substrate) is used. The substrate used as the display surface must be a transparent conductive substrate, and both of the substrates may be a transparent conductive substrate.

The substrate electrode may be a substrate having electrical conductivity itself, or an insulating support having a conductive-treated surface, and may be crystalline or amorphous. Examples of the substrate having electrical conductivity itself include metals such as aluminum, stainless steel, nickel, and chromium, alloy crystals thereof, and semiconductors such as Si, GaAs, GaP, GaN, SiC, and ZnO.

Examples of the insulating support include polymer film, glass, quartz, and ceramic. The conductive-treatment of the insulating support can be carried out by forming thereon a film by vapor deposition, sputtering, ion plating, or other methods using the metals listed as specific examples of the substrate having electrical conductivity itself, or gold, silver, copper or the like.

As the transparent substrate electrode, a conductive substrate comprising a transparent electrode formed on one surface of an insulating transparent support, or a transparent support having electrical conductivity itself are used. Examples of the transparent support having electrical conductivity itself include transparent conductive materials such as ITO (Indium-Tin Oxide), zinc oxide, tin oxide, lead oxide, indium oxide, and copper iodide.

Examples of the insulating transparent support include a film or plate-shaped body of transparent inorganic materials such as glass, quartz, sapphire, MgO, LiF, and $CaF_2$, transparent organic resins such as fluorine resins, polyester, polycarbonate, polyethylene, polyethylene terephthalate, and epoxy resins, as well as optical fiber, and a SELFOC optical plate.

The transparent electrode provided on one surface of the transparent support is formed by vapor deposition, ion plating, sputtering, or other methods using a transparent conductive material such as ITO, zinc oxide, tin oxide, lead oxide, indium oxide, or copper iodide, or by thinly and translucently applying a metal such as Al, Ni, or Au by vapor deposition or sputtering.

In the invention, the one surface of the substrate electrode used as the display surface has a porous structure in opposition to the other substrate electrode (hereinafter sometimes abbreviated as "opposing surface"). In the embodiments of the porous structure, the substrate electrode may have a porous structure itself, or a porous layer may be provided on the opposing surface of the substrate electrode. Examples of the substrate electrode in which the substrate electrode has a porous structure itself include porous metal electrodes obtained by surface-treating with various metal electrodes such as porous aluminum. On the other hand, examples of the porous layer provided on the opposing surface of the substrate electrode include layers composed of titanium oxide, zinc oxide, carbon nanotube, or the like.

Next, the compound A comprising the first molecule (the first electrochromic dye), the compound B comprising the second molecule (the second electrochromic dye), and the compound C having a functional group capable of bonding with the compound B are described below.

Cyclodextrin, which can be used as either of the compounds A and B by substituting the functional group, will be described later.

Compound A

The compound A has a group selected from an aliphatic hydrocarbon group, an aromatic hydrocarbon group and a heterocycle-containing group, each of which contains a functional group capable of adsorbing to the porous structure and bonding with the compound B, and preferably contains a functional group capable of bonding with the compound B after adsorbing to the porous structure. Among them, viologen-dyes, or compounds having a structure represented by any one of the following Formulae (1) to (5) are preferable in the invention.

   Formula (1)

   Formula (2)

   Formula (3)

   Formula (4)

   Formula (5)

Specific examples of the functional group include a carboxyl group, a phosphoric acid salt, a halogen group (a halogen atom), an epoxy group, and an ester group. Among them, a carboxyl group, a phosphoric acid salt, a halogen group (a halogen atom), and an epoxy group are preferable, and a carboxyl group and a phosphoric acid salt are particularly preferable from the viewpoint of the stability after the compound A is bonded with the porous structure.

$R^1$ represents an aliphatic hydrocarbon, an aromatic hydrocarbon, or a heterocycle-containing group, each of which is saturated or unsaturated, contains the above-described functional group, and has 1 to 20 carbon atoms. The number of the functional group in the $R^1$ is not particularly limited, but is usually 1 to 3. The greater the number of the functional group, the more molecules of the compound B are reacted and introduced into the electrochromic display device, which is preferable.

$M^1$ represents a tetravalent element other than carbon. Specific examples of $M^1$ include Si, Ge, Sn, Ti, and Zr. Among them, Si and Ge are preferable, and Si is particularly preferable.

$Y^1$ represents a hydrolysable functional group, and specific examples thereof include a halogen atom and an alkoxy group. Specific examples of the halogen atom include fluorine, chlorine, bromine, and iodine. Among them, chlorine, bromine and iodine are preferable. Specific examples of the alkoxy group include alkoxy groups such as a methoxy group, an ethoxy group, a normalpropoxy group and an isopropoxy group. Specific examples of the hydrolysable functional group further include an isocyano group.

$R^2$ and $R^3$ each independently represent the same group as $R^1$ or an aliphatic hydrocarbon, an aromatic hydrocarbon, or a heterocycle-containing group, each of which is saturated or unsaturated and has 1 to 20 carbon atoms. When each of $R^2$ and $R^3$ is a group that is similar to $R^1$, i.e., an aliphatic hydrocarbon, an aromatic hydrocarbon, or a heterocycle-containing group, each of which is saturated or unsaturated, has 1 to 20 carbon atoms and contains the functional group $R^2$ and $R^3$ may be the same as or different from $R^1$. Further, $R^2$ and $R^3$ may be the same or different from each other.

Z represents $-COOR^4$, $-COX^1$, $-NH_2$, $-OH$, or $-NCO$. $R^4$ represents a hydrogen atom or an aliphatic hydrocarbon group having 1 to 10 carbon atoms. $X^1$ represents a halogen atom. Each of m and n represents an integer.

In the invention, among the compounds represented by any one of Formulae (1) to (5), compounds represented by any one of Formulae (1) to (4), and compounds represented by Formula (5) in which Z is $-COOR^4$, $-COX^1$ or $-NH_2$ are preferable from the viewpoints of reactivity with the substrate (porous structure) and stability after bonding with the substrate.

In the invention, examples of the viologen-dye include bis(2-phosphonylethyl)-4,4'-bipyridinium dichloride and bis(3-carboxy-4-hydroxyphenyl)-4,4'-bipyridinium dichloride. Among them, bis(2-phosphonylethyl)-4,4'-bipyridinium dichloride is preferable.

Specific examples of the compounds represented by Formulae (1) to (5) include p-bromophenyltrichlorosilane [p-BrPhSiCl₃], p-bromophenyltrimethoxysilane [P—BrPhSi(OCH₃)₃], o-bromophenyltrichlorosilane [o-BrPhSiCl₃], o-bromophenyltrimethoxysilane [o-BrPhSi(OCH₃)₃], m-bromophenyltrichlorosilane [m-BrPhSiCl₃], m-bromophenyltrimethoxysilane [m-BrPhSi(OCH₃)₃], (p-bromomethyl)phenyltrichlorosilane [p-BrCH₂PhSiCl₃], (p-bromomethyl)phenyltrimethoxysilane [p-BrCH₂PhSi(OCH₃)₃], bromomethyltrichlorosilane [BrCH₂SiCl₃], bromomethyltrichlorogermane [BrCH₂GeCl₃], bromomethyltrimethoxysilane [BrCH₂Si(OCH₃)₃], bromomethyltrimethoxygermane [BrCH₂Ge(OCH₃)₃], bromomethyltriethoxysilane [BrCH₂Si(OCH₂CH₃)₃], bromomethyldimethylchlorosilane [BrCH₂Si(CH₃)₂Cl], bromomethyldimethylchlorogermane [BrCH₂Ge(CH₃)₂Cl], 2-bromoethyltrichlorosilane [CH₃CHBrSiCl₃], 2-bromoethyltrichlorogermane [CH₃CHBrGeCl₃], 1,2-dibromoethyltrichlorosilane [BrCH₂CHBrSiCl₃], 1,2-dibromoethyltrichlorogermane [BrCH₂CHBrGeCl₃], 3-bromopropyltrichlorogermane [Br(CH₂)₃GeCl₃], 4-bromobutyldimethylchlorosilane [Br(CH₂)₄Si(CH₃)₂Cl], 3-bromopropyltrichlorosilane [Br(CH₂)₃SiCl₃], 3-bromopropyltrimethoxysilane [Br(CH₂)₃Si(OCH₃)₃], 3-bromopropyltriethoxysilane [Br(CH₂)₃Si(OCH₂CH₃)₃], 8-bromooctyltrichlorosilane [Br(CH₂)₈SiCl₃], 8-bromooctyltrimethoxysilane [Br(CH₂)₈Si(OCH₃)₃], 8-bromooctyltriethoxysilane [Br(CH₂)₈Si(OCH₂CH₃)₃], 8-bromooctyldimethylchlorosilane [Br(CH₂)₈Si(CH₃)₂Cl], 11-bromoundecyltrichlorosilane [Br(CH₂)₁₁SiCl₃], 11-bromoundecyltrimethoxysilane [Br(CH₂)₁₁Si(OCH₃)₃], 11-bromoundecyltriethoxysilane [Br(CH₂)₁₁Si(OCH₂CH₃)₃], 3-bromopropyltrichlorogermane [Br(CH₂)₃GeCl₃], bromomethyltribromogermane [BrCH₂GeBr³],
p-chlorophenyltrichlorosilane [p-ClPhSiCl₃], p-chlorophenyltrimethoxysilane [p-ClPhSi(OCH₃)₃], m-chlorophenyltrichlorosilane [m-ClPhSiCl₃], o-chlorophenyltrimethoxysilane [o-ClPhSi(OCH$_3$)$_3$], (p-chloromethyl)phenyltrichlorosilane [p-ClCH$_2$PhSiCl$_3$], (p-chloromethyl)phenyltrimethoxysilane [p-ClCH$_2$PhSi(OCH$_3$)$_3$], (p-chloromethyl)phenylmethyldichlorosilane, [P—ClCH$_2$PhSi(CH$_3$)Cl$_2$], (p-chloromethyl)phenyldimethylchlorosilane [p-ClCH$_2$PhSi(CH$_3$)$_2$Cl], (p-chloromethyl)phenyltri-n-propoxysilane [p-ClCH$_2$PhSi(O-n-C$_3$H$_7$)$_3$], ((p-chloromethyl)phenylethyl)trichlorosilane [p-ClCH$_2$Ph(CH$_2$)$_2$SiCl$_3$], ((p-chloromethyl)phenylethyl)methyldichlorosilane [p-ClCH$_2$Ph(CH$_2$)$_2$Si(CH$_3$)Cl$_2$], ((p-chloromethyl)phenylethyl)dimethylchlorosilane [p-ClCH$_2$Ph(CH$_2$)$_2$Si(CH$_3$)$_2$Cl], ((p-chloromethyl)phenylethyl)trimethoxysilane [p-ClCH$_2$Ph(CH$_2$)$_2$Si(OCH$_3$)$_3$], ((m-chloromethyl)phenylethyl)trichlorosilane [m-ClCH$_2$Ph(CH$_2$)$_2$SiCl$_3$], ((m-chloromethyl)phenylethyl)methyldichlorosilane [m-ClCH$_2$Ph(CH$_2$)$_2$Si(CH$_3$)C$_2$], ((m-chloromethyl)phenylethyl)dimethylchlorosilane [m-ClCH$_2$Ph(CH$_2$)$_2$Si(CH$_3$)$_2$Cl], ((m-chloromethyl)phenylethyl)trimethoxysilane [m-ClCH$_2$Ph(CH$_2$)$_2$Si(OCH$_3$)$_3$], ((o-chloromethyl)phenylethyl)trichlorosilane [o-ClCH$_2$Ph(CH$_2$)$_2$SiCl$_3$], ((o-chloromethyl)phenylethyl)methyldichlorosilane [o-ClCH$_2$Ph(CH$_2$)$_2$Si(CH$_3$)Cl$_2$], ((o-chloromethyl)phenylethyl)dimethylchlorosilane [o-ClCH$_2$Ph(CH$_2$)$_2$Si(CH$_3$)$_2$Cl], ((o-chloromethyl)phenylethyl)trimethoxysilane [o-ClCH$_2$Ph(CH$_2$)$_2$Si(OCH$_3$)$_3$], trichloromethyltrichlorosilane [Cl$_3$CSiCl$_3$], chloromethyltrichlorosilane [ClCH$_2$SiCl$_3$], chloromethyltrichlorogermane [ClCH$_2$GeCl$_3$], chloromethyltrimethoxysilane [ClCH$_2$Si(OCH$_3$)$_3$], chloromethyltriethoxysilane [ClCH$_2$Si(OCH$_2$CH$_3$)$_3$], chloromethyltrimethoxygermane [ClCH$_2$Ge(OCH$_3$)$_3$], chloromethyldimethylchlorosilane [ClCH$_2$Si(CH$_3$)$_2$C], chloromethylmethyldichlorosilane [ClCH$_2$Si(CH$_3$)Cl$_2$], chloromethylmethyldiethoxysilane [ClCH$_2$Si(CH$_3$)(OCH$_2$CH$_3$)$_2$], chloromethylmethyldiisopropoxysilane [ClCH$_2$Si(CH$_3$)(OCH(CH$_3$)$_2$)$_2$], bis(chloromethyl)dichlorosilane [(ClCH$_2$)$_2$SiCl$_2$], bis(chloromethyl)methylchlorosilane [(ClCH$_2$)$_2$SiCH$_3$Cl], 1-chloroethyltrichlorosilane [ClCHCH$_3$SiCl$_3$], 1,2-dichloroethyltrichlorosilane [CH$_2$ClCHClSiCl$_3$], (dichloromethyl)trichlorosilane [CHCl$_2$SiC$_3$], (dichloromethyl)methyldichlorosilane [CHCl$_2$Si(CH$_3$)Cl$_2$], (dichloromethyl)dimethylchlorosilane [CHCl$_2$Si(CH$_3$)$_2$Cl], 2-chloroethyltrichlorosilane [Cl(CH$_2$)$_2$SiCl$_3$], 2-chloroethyltriethoxysilane [Cl(CH$_2$)$_2$Si(OCH$_2$CH$_3$)$_3$], 2-chloroethylmethyldichlorosilane [Cl(CH$_2$)$_2$SiCl$_2$CH$_3$], 2-chloroethylmethyldimethoxysilane [Cl(CH$_2$)$_2$Si(OCH$_3$)$_2$CH$_3$], 2-(chloromethyl)allyltrichlorosilane [CH$_2$=C(CH$_2$Cl)SiCl$_3$], 1-(chloromethyl)allyltrichlorosilane [CH(CH$_2$Cl)=CH$_2$SiCl$_3$], 3-chloropropyltrichlorosilane [Cl(CH$_2$)$_3$SiCl$_3$], 3-chloropropyltrichlorogermane [Cl(CH$_2$)$_3$GeCl$_3$], 3-chloropropyldimethylchlorosilane [Cl(CH$_2$)$_3$Si(CH$_3$)$_2$Cl], 3-chloropropyldimethylchlorogermane [Cl(CH$_2$)$_3$Ge(CH$_3$)$_2$Cl], 3-chloropropylmethyldichlorosilane [Cl(CH$_2$)$_3$Si(CH$_3$)Cl$_2$], 3-chloropropylphenyldichlorosilane [Cl(CH$_2$)$_3$SiPhCl$_2$], 3-chloropropyldimethylmethoxysilane [Cl(CH$_2$)$_3$Si(CH$_3$)$_2$(OCH$_3$)], 3-chloropropyltrimethoxysilane [Cl(CH$_2$)$_3$Si(OCH$_3$)$_3$], 3-chloropropyltriethoxysilane [Cl(CH$_2$)$_3$Si(OCH$_2$CH$_3$)$_3$], 3-chloropropylmethyldimethoxysilane [Cl(CH$_2$)$_3$SiCH$_3$(OCH$_3$)$_2$], 3-chloropropylmethyldiethoxysilane [Cl(CH$_2$)$_3$SiCH$_3$(OCH$_2$CH$_3$)$_2$], 4-chlorobutyldimethylchlorosilane [Cl(CH$_2$)$_4$SiCl(CH$_3$)$_2$], 8-chlorooctyltrichlorosilane [Cl(CH$_2$)$_8$SiCl$_3$], 8-chlorooctyltrimethoxysilane [Cl(CH$_2$)$_8$Si(OCH$_3$)$_3$], 8-chlorooctyltriethoxysilane [Cl(CH$_2$)$_8$Si(OCH$_2$CH$_3$)$_3$], p-iodophenyltrichlorosilane [p-IPhSiCl$_3$], p-iodophenyltrimethoxysilane [p-IPhSi(OCH$_3$)$_3$], (p-iodomethyl)phenyltrichlorosilane [p-ICH$_2$PhSiCl$_3$], (p-iodomethyl)phenyltrimethoxysilane [p-ICH$_2$PhSi(OCH$_3$)$_3$], iodomethyltrichlorosilane [ICH$_2$SiCl$_3$], iodomethyltrimethoxysilane [ICH$_2$Si(OCH$_3$)$_3$], iodomethyltriethoxysilane [ICH$_2$Si(OCH$_2$CH$_3$)$_3$], 3-iodopropyltrichlorosilane [I(CH$_2$)$_3$SiCl$_3$], 3-iodopropyltrimethoxysilane [I(CH$_2$)$_3$Si(OCH$_3$)$_3$], 3-iodopropyltriethoxysilane [I(CH$_2$)$_3$Si(OCH$_2$CH$_3$)$_3$], 8-iodooctyltrichlorosilane [I(CH$_2$)$_8$SiCl$_3$], 8-iodooctyltrimethoxysilane [I(CH$_2$)$_8$Si(OCH$_3$)$_3$], 8-iodooctyltriethoxysilane [I(CH$_2$)$_8$Si(OCH$_2$CH$_3$)$_3$], (3-glycidoxypropyl)trimethoxysilane [CH$_2$OCHCH$_2$—O—(CH$_2$)$_3$Si(OCH$_3$)$_3$], acetoxyethyltrichlorosilane [CH$_3$COOCH$_2$CH$_2$SiCl$_3$], acetoxyethyltriethoxysilane [CH$_3$COOCH$_2$CH$_2$Si(OCH$_2$CH$_3$)$_3$], acetoxyethyltrimethoxysilane [CH$_3$COOCH$_2$CH$_2$Si(OCH$_3$)$_3$], 3-bromopropylthiol [Br(CH$_2$)$_3$SH], 8-bromooctylthiol [Br(CH$_2$)$_8$SH], 11-bromoundecylthiol [Br(CH$_2$)$_{11}$SH], p-bromophenylthiol [p-BrPhSH], o-bromophenylthiol [o-BrPhSH], m-bromophenylthiol [m-BrPhSH], (p-bromomethyl)phenylthiol [p-BrCH$_2$PhSH], 3-chloropropylthiol [Cl(CH$_2$)$_3$SH], 8-chlorooctylthiol [Cl(CH$_2$)$_8$SH], p-chlorophenylthiol [p-ClPhSH], o-chlorophenylthiol [o-ClPhSH], m-chlorophenylthiol [m-ClPhSH], (p-chloromethyl)phenylthiol [p-ClCH$_2$PhSH], 3-iodopropylthiol [I(CH$_2$)$_3$SH], 8-iodooctylthiol [I(CH$_2$)$_8$SH], p-iodophenylthiol [p-IPhSH], m-iodophenylthiol [m-IPhSH], (p-iodomethyl)phenylthiol [p-ICH$_2$PhSH], bromoacetic acid [BrCH$_2$COOH], o-bromobenzoic acid [o-BrPhCOOH], m-bromobenzoic acid [m-BrPhCOOH], p-bromobenzoic acid [p-BrPhCOOH], 3-bromopropionic acid [Br(CH$_2$)$_2$COOH], α-bromo-p-toluic acid [BrCH$_2$PhCOOH], 11-bromoundecanoic acid [Br(CH$_2$)$_{10}$COOH], 4-(bromomethyl)benzoic acid [4-BrCH$_2$PhCOOH], 6-bromohexanoic acid [6-Br(CH$_2$)$_5$COOH], o-chlorobenzoic acid [o-ClPhCOOH], m-chlorobenzoic acid [m-ClPhCOOH], p-chlorobenzoic acid [p-ClPhCOOH], 4-bromo-n-butyric acid [4-Br(CH$_2$)$_3$COOH], 4-chlorobutyric acid [Cl(CH$_2$)$_3$COOH], 3-iodopropionic acid [I(CH$_2$)$_2$COOH], o-iodobenzoic acid [o-IPhCOOH], m-iodobenzoic acid [m-IPhCOOH], p-iodobenzoic acid [p-IPhCOOH], 4-bromoisophthalic acid [4-BrPh(COOH)$_2$], 4-bromobutyryl chloride [Br(CH$_2$)$_3$COCl], 2-bromoacetyl bromide [BrCH$_2$COBr], 6-bromohexanoyl chloride [Br(CH$_2$)$_5$COCl], 5-bromovaleryl chloride [Br(CH$_2$)$_4$COCl], choroacetyl chloride [ClCH$_2$COCl], o-chlorobenzoyl chloride [o-ClPhCOCl], m-chlorobenzoyl chloride [m-ClPhCOCl], p-chlorobenzoyl chloride [p-ClPhCOCl], p-bromobenzoyl chloride [p-BrPhCOCl], 2-bromobenzoyl chloride [2-BrPhCOCl], 3-bromobenzoyl chloride [3-BrPhCOCl], 4-chlorobutyryl chloride [Cl(CH$_2$)$_3$COCl], 3-chloropropionyl chloride [Cl(CH$_2$)$_2$COCl], o-iodobenzoyl chloride [o-IPhCOCl], m-iodobenzoyl chloride [m-IPhCOCl], p-iodobenzoyl chloride [p-IPhCOCl], 4-bromobenzyl alcohol [4-BrPhCH$_2$OH], 2-bromoethanol [2-Br(CH$_2$)$_2$OH], 12-bromo-1-dodecanol [Br(CH$_2$)$_{12}$OH], 4-bromophenetyl alcohol [BrPh(CH$_2$)$_2$OH], 11-bromo-1-undecanol [Br(CH$_2$)$_{10}$H], p-chlorobenzyl alcohol [p-ClPhCH$_2$OH], 4-chloro-1-butanol [Cl(CH$_2$)$_4$OH], 4-chlorophenethyl alcohol [ClPh(CH$_2$)$_2$OH], p-chlorophenol [p-ClPhOH], 2-chloroethyl isocyanate [Cl(CH$_2$)$_2$NCO], 2-chlorophenyl isocyanate [2-ClPhNCO], 3-chlorophenyl isocyanate [3-ClPhNCO], 4-chlorophenyl isocyanate [4-ClPhNCO], 2,3-dichlorophenyl isocyanate [2,3-ClClPhNCO], 4-bromophenyl isocyanate [4-BrPhNCO], 2-bromophenyl isocyanate [2-BrPhNCO], p-chloroaniline [p-ClPhNH$_2$], o-chloroaniline [o-ClPhNH$_2$], m-chloroaniline [m-ClPhNH$_2$], p-bromoaniline [p-BrPhNH$_2$], o-bromoaniline [o-BrPhNH$_2$], m-bromoaniline [m-BrPhNH$_2$], and p-chlorobenzylamine [p-ClPhCH$_2$NH$_2$].

In these formulae, "Ph" represents a phenyl group.

Among the above-mentioned compounds, silane compounds are preferable from the viewpoints of easy synthesis, high strength, and abundance of variations.

Among the above-mentioned compounds, those represented by Formula (1) can bond with the hydroxyl groups or other groups on the surface of the substrate electrode through three $Y^1$s. Further, those represented by Formula (2) in which $R^2$ and $R^1$ are the same as each other can bond with the hydroxyl groups or other groups on the surface of the substrate electrode through two $Y^1$s and $R^2$. Furthermore, those represented by Formula (3) in which $R^2$ and $R^3$ are the same as $R^1$ can combine with the hydroxyl groups or other groups on the surface of the substrate electrode through $Y^1$, $R^2$ and $R^3$. Thus these compounds have the advantage of increasing the bonding power per molecule of the compound A to the substrate electrode.

Among the above-mentioned compounds, those represented by Formula (2) in which $R^2$ is an aliphatic hydrocarbon, an aromatic hydrocarbon, or a heterocycle-containing group, each of which is saturated or unsaturated and has 1 to 20 carbon atoms, are capable of bonding with the hydroxyl groups or other groups on the surface of the substrate electrode through two $Y^1$s. Further, those represented by Formula (3) in which each of $R^2$ and $R^3$ is an aliphatic hydrocarbon, an aromatic hydrocarbon, or a heterocycle-containing group, each of which is saturated or unsaturated and has 1 to 20 carbon atoms, are capable of combining with the hydroxyl groups or other groups on the surface of the substrate electrode through one $Y^1$. Accordingly, they can decrease the number of bonds between one molecule of the compound A and the substrate electrode, which allows the introduction of more molecules of the compound A into the substrate electrode.

Compound B

The compound B is not particularly limited as long as it is a functional molecule having at least one functional group capable of bonding with the compound A and one functional group capable of bonding with the compound C, and can be appropriately selected in accordance with necessity. As described above, if the compound B exhibits electrochromism that is different from that of viologen, multicolor display in a single pixel can be achieved. As the compound B, pH indicators or the like which can be used with no chemical modification are preferable.

Other examples of the compound B include: an aliphatic hydrocarbon compound, an aromatic hydrocarbon compound, and a heterocycle-containing compound, each of which is saturated or unsaturated and has an amino group which is a functional group capable of bonding with the compound A, and a halogen group which is a functional group capable of bonding with the compound C; an aliphatic hydrocarbon compound, an aromatic hydrocarbon, and a heterocycle-containing compound, each of which is saturated or unsaturated and has a carboxyl group which is a functional group capable of bonding with the compound A, and a halogen group which is a functional group capable of bonding with the compound C; and an aliphatic hydrocarbon compound, an aromatic hydrocarbon compound, and a heterocycle-containing compound, each of which is saturated or unsaturated and has a hydroxyl group which is a functional group capable of bonding with the compound A, and a halogen, amino, or carboxyl groups which is a functional group capable of bonding with the compound C.

Specific examples of the compound B include ruthenium-containing compounds such as cis-dibromobis(2,2-bipyridyl-4,4'-di-4,4'-dicarboxylate) ruthenium (II), cis-dichlorobis(2,2-bipyridyl-4,4'-di-4,4'-dicarboxylate) ruthenium (II), and cis-diiodobis(2,2-bipyridyl-4,4'-di-4,4'-dicarboxylate) ruthenium (II), osmium-containing compounds such as cis-dichlorobis(2,2-bipyridyl-4,4'-di-4,4'-dicarboxylate) osmium (II) and cis-diiodobis(2,2-bipyridyl-4,4'-di-4,4'-dicarboxylate) osmium ruthenium (II), phthalocyanine dyes such as (tetraminophthalocyanate) cobalt (II), (tetraminophthalocyanate) copper (II), (tetraminophthalocyanate) nickel (II), (tetracarboxyphthalocyanate) cobalt (II), (tetracarboxyphthalocyanate) copper (II), (tetracarboxyphthalocyanate) iron (II), (tetracarboxyphthalocyanate) nickel (II), and tetracarboxyphthalocyanate) oxovanadium (IV), porphyrin dyes such as 5,10,15,20-tetrakis(4-aminophenyl)-21H,23H-porphyrin and 5,10,15,20-tetrakis (4-carboxylphenyl)-21H,23H-porphyrin, 4-aminobenzoic acid, terephthalic acid, p-phenylenediamine, ethylenediamine, 1,5-diaminonaphthalene, 1,8-diaminonaphthalene, and 2,7-diaminofluorene.

As the compound B, known pH indicators can be used, and methyl orange-, methyl yellow- or thymol blue-based pH indicators on the are particularly preferable in that these pH indicators cause a color change at a polarity that is different from that which is needed by viologen, which is a common electrochromic dye, and in that each of these pH indicators can singly cause two or more modes of color changes.

Compound C

The compound C is not particularly limited as long as it is a functional molecule having at least one functional group capable of bonding with the functional group of the compound B, and can be appropriately selected in accordance with necessity. As is the case with the compound B, pH indicators and the like are preferable due to usability with no chemical modification. Examples thereof further include an aliphatic hydrocarbon compound, an aromatic hydrocarbon compound, or a heterocycle-containing compound, each of which is saturated or unsaturated and has a cyano group; an aliphatic hydrocarbon compound, an aromatic hydrocarbon compound, or a heterocycle-containing compound, each of which is saturated or unsaturated and has an amino group; an aliphatic hydrocarbon alkali metal compound, an aromatic hydrocarbon alkali metal compound, or a heterocycle-containing alkali metal compound, each of which is saturated or unsaturated and has a carboxyl group; an aliphatic hydrocarbon compound, an aromatic hydrocarbon compound, or a heterocycle-containing compound, each of which is saturated or unsaturated and has a hydroxyl group; and phosphine compounds.

In the invention, the multicolor effect can be enhanced by using, as the compound C, a pH indicator which exhibits a color change at a polarity that is different from that which is needed by the compound B.

Specific examples of the compound C include ruthenium-containing compounds such as tris(2,2'-bipyridyl-4,4'-dicarboxylate) ruthenium (II), tris(2,2'-bipyridyl-4,4'-diamino) ruthenium (II), ruthenium (2,2'-bipyridyl-4,4'-di-4,4'-dicarboxylate)$_2$(µ-(cyano)ruthenium(cyano)(2,2'-bipyridyl)$_2$)$_2$, cis-di-(thiocyanate)bis-(2,2'-bipyridyl-4,4'-di-4,4'-dicarboxylate) ruthenium (II), ruthenium (2,2'-bipyridyl-4,4-di-4, 4'-diamino)$_2$(µ-(cyano)ruthenium(cyano)(2,2'-bipyridyl)$_2$)$_2$, cis-di(thiocyanate)bis-(2,2'-bipyridyl-4,4-di-4,4'-dicarboxylate) ruthenium (II), cis-dicyanobis(2,2'-bipyridyl-4,4'-di-4,4-dicarboxylate) ruthenium (II), cis-dicyanobis(2,2'-bipyridyl-4,4'-di-4,4'-diamino) ruthenium (II), cis-dibromobis(2,2'-bipyridyl-4,4'-di-4,4'-dicarboxylate) ruthenium (II), cis-dichlorobis(2,2'-bipyridyl-4,4'-di-4,4'-dicarboxylate) ruthenium (II), or cis-diiodobis(2,2'-bipyridyl-4,4'-di-4,4'-dicarboxylate) ruthenium (II);

phthalocyanine dyes such as (tetraminophthalocyanate) cobalt (II), (tetraminophthalocyanate) copper (II), (tetraminophthalocyanate) nickel (II), (tetracarboxyphthalocyanate) cobalt (II), (tetracarboxyphthalocyanate) copper (II), (tetracarboxyphthalocyanate) iron (II), or (tetracarboxyphthalocyanate) nickel (II); porphyrin dyes such as 5,10,15,20-tetrakis (4-aminophenyl)-21H,23H-porphyrin, 5,10,15,20-tetrakis (4-pyridylphenyl)-21H,23H-porphyrin, 5,10,15,20-tetrakis (4-carboxylphenyl)-21H,23H-porphyrin, or oxo[5,10,15,20-tetra(4-pyridyl)porphyrinate]titanium (IV);

xanthine dyes such as fluorescein, 4',5'-dibromofluorescein, 2',7'-dibromofluorescein, 2',4',5',7'-tetrabromofluorescein, 4',5'-dichlorofluorescein, 2',7'-dichlorofluorescein, 2',4',5',7'-tetrachlorofluorescein, 4',5'-diiodofluorescein, 2',7'-diiodofluorescein, 2',4',5',7'-tetraiodofluorescein, 4-carboxyfluorescein, 5-carboxyfluorescein, 4',5'-diiodofluorescein, 4',5'-dinitrofluorescein, 4-aminofluorescein, 5-aminofluorescein, 4,5,6,7-tetrachlorofluorescein, 4-(iodoacetamide)fluorescein, 4-carboxy-2',4',5',7'-tetraiodofluorescein, 9-(2-methoxycarbonylphenyl)-6-hydroxy-3H-xanthine-3-ene, 2,4,5,7-tetraiodo-9-(2-methoxycarbonylphenyl)-6-hydroxy-3H-xanthine-3-ene, or 2,4,5,7-tetrabromo-9-(2-methoxycarbonylphenyl)-6-hydroxy-3H-xanthine-3-ene;

rhodamine dyes such as rhodamine B or rhodamine 123; 1,4-dicyanobenzene, 2,3-dicyanonaphthalene, 3-cyanothiophene, 4-cyano-4'-nitrobiphenyl, 4-cyano-4'-aminobiphenyl, 4-cyanoaniline, 2-cyano-4-nitroaniline, p-phenylenediamine, ethylenediamine, 1,5-diaminonaphthalene, 1-aminoanthraquinone, 2-aminoanthraquinone, and the like.

In the manufacture of the electrochromic display device of the invention, the substrate electrode (the porous structure side) is subjected to at least a reaction for bonding with the compound A (hereinafter sometimes referred to as "reaction A") and a reaction for bonding with the compound B (hereinafter sometimes referred to as "reaction B"), and may be further subjected to a reaction for bonding with the compound C (hereinafter sometimes referred to as "reaction C") in accordance with necessity.

Reaction A

The reaction A can be carried out by contacting a solvent containing at least one of the compound A with the porous structure of the substrate electrode.

As a result of the reaction A, the compound A forms a chemical bond with the surface of the substrate electrode, and a monomolecular thin film of the compound A is formed on the substrate electrode. The bond refers to a chemical bond such as a covalent bond and an ionic bond. For example, when a compound represented by any one of Formula (1) ($R^1M^1Y^1_3$), Formula (2) ($R^1R^2M^1Y^1_2$), Formula (3) ($R^1R^2R^3M^1Y^1$) and Formula (4) ($R^1$—SH) is used as the compound A, the bond is a covalent bond such as —$M^1$—O— or —S—. In the instance where a compound represented by Formula (5) ($R^1_mZ_n$) in which Z is —$COOR^4$ or —$COX^1$ is used, the bond is a covalent bond represented by —COO—. In the instance where a compound represented by Formula (5) in which Z is —$NH_2$ is used, the bond is a covalent bond represented by —NH—. In the instance where a compound represented by Formula (5) in which Z is —OH is used, the bond is a covalent bond represented by —O—. Further, in the instance where a compound represented by Formula (5) in which Z is —NCO is used, the bond is a covalent bond represented by —OOCNH—. Thus, the substrate electrode is strongly bonded with the compound A, and the monomolecular thin film of the compound A will not readily exfoliates from the substrate electrode.

In this instance, the group of the compound A which bonds with the substrate electrode is a group other than the group selected from an aliphatic hydrocarbon group, an aromatic hydrocarbon group and a heterocycle-containing group, each of which contains the functional group capable of bonding with the compound B. More specifically, the group of the compound A which bonds with the substrate electrode is not $R^1$, but rather $Y^1$, —SH, —$COOR^4$, —$COX^1$, —$NH^2$, —OH, or —NCO in Formulae (1) to (4). The group selected from an aliphatic hydrocarbon group, an aromatic hydrocarbon group and a heterocycle-containing group, each of which contains the functional group capable of bonding with the compound B, more weakly interacts with the substrate electrode than other groups of the compound A, and thus they scarcely react with the substrate electrode. When $R^1$ bonds with the substrate electrode, $Y^1$ is physically inhibited from bonding with the substrate electrode by the shape of the molecule, whereby the functional group reacts with the compound B in the reaction B. In the latter case, $R^1$ and $Y^1$ in the compound A may be the same.

Examples of the solvent include organic solvents such as hydrocarbon solvents, ester solvents, ether solvents, halogen solvents or alcohol solvents, water, and mixed solvents thereof.

Examples of the hydrocarbon solvent include toluene, benzene, xylene, hexane, octane, hexadecane, and cyclohexane.

Examples of the ester solvent include methyl acetate, ethyl acetate, isopropyl acetate, and amyl acetate.

Examples of the ether solvent include dibutyl ether, dibenzyl ether and the like.

Examples of the halogen solvent include 1,1-dichloro-1-fluoroethane, 1,1-dichloro-2,2,2-trifluoroethane, 1,1-dichloro-2,2,3,3,3-pentafluoropropane, chloroform, dichloroethane, and carbon tetrachloride.

Examples of the alcohol solvent include methanol, ethanol, and i-propyl alcohol.

The reaction A is efficiently promoted by the application of heat in a temperature range of about 30 to 200° C., the addition of a catalyst such as dicyclohexyl carbodiimide or triethylamine, and/or the application of ultrasonic vibrations during the contact.

Among these solvents, those used in the Examples which will be described later are preferable. Toluene, hexane, hexadecane or the like are preferable in that they achieve high treatment efficiency, and can form a uniform thin film on the substrate electrode.

The content of the compound A in the solvent containing at least one of the compound A is, for example, usually about 1.0 to $100,000 \times 10^{-4}$ mol/l, and preferably about 1.0 to $10 \times 10^{-4}$ mol/l.

If the content is less than about $1.0 \times 10^{-4}$ mol/l, it is not preferable in that the dipping treatment of the substrate electrode takes a longer time, and if the content exceeds about $100,000 \times 10^{-4}$ mol/l, the molecules of the compound A may react with each other, which would result in failure in forming a uniform thin film.

The contact can be carried out by, for example, immersing the substrate electrode in the solvent containing at least one of the compound A (hereinafter sometimes referred to as "solution A"), spraying the solution A on the substrate electrode, or applying the solution A to the substrate electrode by casting.

Among them, immersing of the substrate electrode in the solution A is preferable for carrying out the contact from the viewpoints of efficiency and convenience of operation.

The length of time to contact the solution A with the substrate electrode is usually several minutes to about one week, and preferably about 30 minutes to one day.

If the contact time is less than several minutes, the treatment may not be thoroughly completed, which may result in insufficient introduction of the compound A into the substrate electrode. On the other hand, contact time in excess of about one week will not provide a valuable effect, which is also not preferable from the viewpoint of poor efficiency of the treatment.

The reaction A may be efficiently promoted by heating at a temperature of about 30 to 120° C., and/or stirring the solution during the contact. It is also effective to wash the substrate electrode or subject the substrate electrode to plasma treatment or corona discharge treatment before the contact.

The compound A may be singly vaporized and contacted with the substrate electrode. Mixture of the vapor of the compound A with a carrier gas (e.g., nitrogen, argon) may also be contacted with the substrate electrode.

The washing of the substrate electrode may be, for example, washing with an organic solvent such as methanol, ethanol, or i-propyl alcohol, washing with an acidic aqueous solution such as HF or HCl, washing with an alkaline aqueous solution such as $NH_4OH$, washing with $UV/O_3$, or combinations thereof.

After the reaction A, the substrate electrode may be washed with an organic solvent such as n-hexadecane, decane, toluene, acetone, methanol, or ethanol to remove unreacted molecules of the compound A, and the substrate electrode may be heated in order to reinforce the bonds between the compound and the substrate electrode, or in other words, in order to substantially complete the reaction between the compound A and the substrate electrode.

Reaction B

The reaction B can be carried out preferably by, for example, contacting the substrate electrode having the compound A at the surface thereof with a solvent containing at least one of the compound B (hereinafter sometimes referred to as "solution B"), while in some instances, the solutions A and B may be mixed first and the substrate electrode may be then contacted with the mixture of the solutions A and B, or the solutions A and B and the substrate electrode may be simultaneously contacted with each other.

The reaction B causes the interaction between the functional group of the compound B, which is capable of bonding with the functional group of compound A, and the functional group of the compound A selected from an aliphatic hydrocarbon group containing the functional group, aromatic hydrocarbon group containing the functional group, and a heterocycle-containing group containing the functional group, by which the functional group of the compound B bonds with the compound A at the position where its functional group has been bonded to, and as a result, the compound B bonds with the compound A, and a monomolecular thin film composed of at least one of the compound B is accumulated on the monomolecular thin film of the compound A formed on the substrate electrode.

The solvent used in the reaction B is similar to that used in the reaction A. The contact method used in the reaction B is also similar to that in the reaction A.

The length of time to contact the solution B with the substrate electrode is usually about several minutes to about one week, and preferably about 30 minutes to about one day.

If the contact time is less than about several minutes, the treatment may not be thoroughly completed, which may result in insufficient introduction of the compound B into the substrate electrode. On the other hand, contact length in excess of about one week will not provide a valuable effect, which is also not preferable from the viewpoint of poor efficiency of the treatment.

The reaction B is efficiently promoted by heating at a temperature of about 30 to 200° C., adding a catalyst such as calcium chloride, dicyclohexyl carbodiimide or triethylamine, and/or stirring the solution during the contact. After the reaction B, the substrate electrode may be washed with an organic solvent such as acetone, methanol, or ethanol, or may be dried in an inert gas such as argon or nitrogen to remove unreacted molecules of the compound B.

The compound B may be vaporized and contacted with the substrate electrode.

Reaction C

The reaction C may be preferably carried out by, for example, contacting the substrate electrode having the compound B, which has been bonded with the compound A, at the surface with a solvent containing at least one of the compound C (hereinafter sometimes referred to as "solution C"), while in some instances, the solutions A, B, and C may be mixed first and then the substrate electrode may be contacted with the mixture of the solutions A, B, and C, or the solutions A, B, and C, and the substrate electrode may be simultaneously contacted with each other.

The reaction C causes the interaction between the functional group of the compound C, which is capable of bonding with the functional group of compound B, and the functional group of the compound B selected from an aliphatic hydrocarbon group containing the functional group, an aromatic hydrocarbon group containing the functional group, and a heterocycle-containing group containing the functional group, by which the functional group of the compound C bonds with the compound B at the position where its functional group has been bonded to, and as a result, the compound C bonds with the compound B, and a monomolecular thin film composed of at least one of the compound C is accumulated on the monomolecular thin film of the compound B accumulated on the monomolecular thin film of the compound A formed on the substrate electrode.

In the invention, on the monomolecular thin film of the compound C formed on the outermost surface (in other words, on the surface of the accumulated film comprising the monomolecular thin film of the compound A, the monomolecular thin film of the compound B, and the monomolecular thin film of the compound C), there may be provided one or more layers of monomolecular thin films of a compound identical to or different from any of the compounds A to C.

In the invention, the durability of the accumulated film is higher when the monomolecular thin film of the compound C is accumulated on the monomolecular thin film of the compound B in comparison with the instance where only the monomolecular thin films of the compounds A and B are accumulated on the substrate electrode. More specifically, the accumulation of at least the monomolecular thin film of the compound C on the accumulated film composed of the monomolecular thin films of the compounds A and B enhances the durability, scratch resistance, and strength of the whole accumulated film.

The solvent used in the reaction C is similar to that used in the reaction B. The contact method used in the reaction C is also similar to that in the reaction B.

The length of time to contact the solution C with the substrate electrode is usually about several minutes to about one week, and preferably about 30 minutes to about one day.

If the contact time is less than several minutes, the treatment may not be thoroughly completed, which may result in insufficient introduction of the compound C into the substrate electrode. On the other hand, contact time in excess of about one week will not provide a valuable effect, which is also not preferable from the viewpoint of poor efficiency of the treatment.

The reaction C is efficiently promoted by heating at a temperature of about 30 to 200° C., adding a catalyst such as calcium chloride, dicyclohexyl carbodiimide or triethylamine, and/or stirring the solution during the contact. After the reaction C, the substrate electrode may be washed with an organic solvent such as acetone, methanol, or ethanol, or may be dried in an inert gas such as argon or nitrogen to remove unreacted molecules of the compound C. The compound C may be vaporized and contacted with the substrate electrode.

By the reactions A, B, and C, a monomolecular thin film of the compound A is accumulated on the substrate electrode, and on the surface of the monomolecular thin film of the compound A, a monomolecular thin film of the compound B, which is a functional molecule, and a monomolecular thin film of the compound C are efficiently accumulated in that order.

Clathrate Compound

A clathrate compound having a functional group capable of adsorbing to the porous structure can be used as the compound A (the first molecule), and examples thereof include cyclodextrin. As cyclodextrin is capable of clathrating organic molecules, cyclodextrin can fix a molecule (the fourth electrochromic dye) to the surface of the substrate electrode by clathrating the molecule as well as chemically bonding with the compound B (the second molecule). In this instance, the compound A having a functional group capable of adsorbing to the porous structure is a clathrate compound, and the compound A can be disposed on the porous structure through the functional group in such a manner that the compound A forms a clathrate with the fourth electrochromic dye. As the inside of cyclodextrin is hydrophobic, highly hydrophobic dyes (e.g., organic pigments) can be used in an ECD device by using cyclodextrin. Moreover, dye molecules are stabilized by being clathrated so as to significantly increase their heat resistance and light resistance.

Cyclodextrin can be used as the first molecule by substituting its functional group (OH) with COOH or phosphate, or as the second molecule with no substitution of OH. Cyclodextrin can further combine with or include other molecules.

Accordingly, three or more dyes can be included (or bonded) by using appropriately selected functional groups (e.g., OH, COOH) of the clathrate compound. An embodiment of this configuration comprises, sequentially from the porous structure of the substrate electrode, a compound capable of bonding with or including a dye, (e.g., cyclodextrin), a dye having a functional group capable of bonding with the compound, and a compound or a dye capable of bonding with or including the dye.

Examples of the typical guest molecule which is clathrated in cyclodextrin include benzene, naphthalene, and flavonoid. Among them, anthocyanin dyes, which are a kind of flavonoid dyes, are known to change their color tone in accordance with change in pH. Therefore, multicolor display with a single molecule can be achieved by using an anthocyanin dye as the guest molecule of the cyclodextrin.

Electrolyte Solution

The electrolyte solution is not particularly limited and can be appropriately selected, and examples thereof include aqueous or nonaqueous solutions such as alcohol or propylene carbonate solutions of salts such as imidazolium bromide, potassium chloride, lithium chloride, potassium carbonate, or tetraethyl ammonium perchlorate, alkalis such as sodium hydrate or potassium carbonate, acids such as sulfuric acid or hydrochloric acid, and mixtures thereof. They may be used alone or in combination of two or more.

EXAMPLES

Hereinafter, the invention is more specifically explained by way of the following Examples, but the scope of the invention is not limited thereby.

Example 1

A $TiO_2$ porous film is used as the porous semiconductor layer. $TiO_2$ paste (trade name: PECC-01, manufactured by Peccell Technologies Inc.) is applied to an ITO substrate with a squeegee at a thickness of 50 µm, and this is heated on a hot plate at 150° C. for 10 minutes, whereby a $TiO_2$ porous substrate (substrate electrode) is obtained.

The substrate is dipped in a 0.02 mol/l aqueous solution of bis(2-phosphonylethyl)-4,4'-bipyridinium dichloride (viologen phosphate compound) for one day. The substrate is washed with ethanol, dried, and then immersed in a 0.02 mol/l aqueous solution of pelargonidin chloride (anthocyanin compound) for one day. The substrate is washed with ethanol, dried, and then an electrochromic display device is formed. A transparent conductive glass substrate (U film) (trade name: A110U80, manufactured by Asahi Glass Co., Ltd.) is used as the opposing electrode, and a 0.2 mol/l aqueous solution of imidazolium bromide is used as the electrolyte solution. The spacer thickness is 60 µm. As a result, a color change from red to purple to blue is caused with the application of a sine wave of ±2.4V, and the function of a multicolor electrochromic display device is confirmed. In the device, the red color is exhibited by the anthocyanin compound, and the blue color is exhibited by anthocyanin and viologen. The color exhibition of anthocyanin is presumably due to the pH change in water in the vicinity of the electrodes.

Example 2

As the porous semiconductor layer of Example 2, a $TiO_2$ porous film prepared in the same manner as that of Example 1 is used.

The substrate is dipped in a 0.02 mol/l aqueous solution of a viologen phosphate compound for one day. The substrate is washed with ethanol, dried, and then immersed in a solution containing 0.02 mol/l of thymol blue and 2 wt % of sodium carbonate for one day. The substrate is washed with ethanol, dried, and then an electrochromic display device is formed. AU film (trade name: A110U80, manufactured by Asahi Glass Co., Ltd.) is used as the opposing electrode, and a 0.2 mol/l aqueous solution of imidazolium bromide is used as the electrolyte solution. The spacer thickness is 60 µm. As a result, a color change from red to light yellow to blue is caused with the application of a sine wave of ±2.4V, and the function of a multicolor electrochromic display device is confirmed. In the device, the red color is exhibited by thymol blue, and the blue color is exhibited by thymol blue and viologen. The color exhibition of thymol blue is presumably due to the pH change in water in the vicinity of the electrodes.

Example 3

As the porous semiconductor layer of Example 3, a $TiO_2$ porous film prepared in the same manner as that of Example 1 is used.

The substrate is dipped in a solution containing 0.03 mol/l of COOH-substituted cyclodextrin and 2% of sodium carbonate for one day. The substrate is washed with ethanol, dried, and then immersed in a 0.02 mol/l aqueous solution of pelargonidin chloride for one day. The substrate is washed with ethanol, dried, and then an electrochromic display device is formed. A U film (trade name: A110U80, manufactured by Asahi Glass Co., Ltd.) is used as the opposing electrode, and a 0.2 mol/l aqueous solution of imidazolium bromide is used as the electrolyte solution. The spacer thickness is 60 μm. As a result, a color change from red to purple to blue is caused with the application of a sine wave of ±2.4V, and the function of a multicolor electrochromic display device is confirmed. All the color changes of the device are due to the color exhibition of the anthocyanin compound. The color exhibition of anthocyanin is presumably due to the pH change in water in the vicinity of the electrodes.

Example 4

As the porous semiconductor layer of Example 4, a $TiO_2$ porous film prepared in the same manner as that of Example 1 is used.

The substrate is dipped in a 0.001 mol/l solution of 4-(bromomethyl)benzoyl chloride in n-hexadecane for 2 hours, and heated at 80° C. for 30 minutes. The substrate is washed with ethanol, dried, and then immersed in a 0.02 mol/l aqueous solution of carboxy fluorescein for one day. The substrate is washed with ethanol, dried, and then dipped in a 0.02 mol/l aqueous solution of bromophenol blue chloride for one day. The substrate is washed with ethanol, dried, and then an electrochromic display device is formed. A U film (trade name: A110U80, manufactured by Asahi Glass Co., Ltd.) is used as the opposing electrode, and a 0.2 mol/l aqueous solution of imidazolium bromide is used as the electrolyte solution. The spacer thickness is 60 μm. As a result, a color change from light yellow to blue to purple is caused with the application of a sine wave of ±2.4V, and the function of a multicolor electrochromic display device is confirmed. In the device, the blue color is exhibited by bromophenol blue, and the purple color is exhibited by bromophenol blue and carboxy fluorescein. The color exhibition of both molecules is presumably due to the pH change in water in the vicinity of the electrodes. The intermolecular bonds are formed in the order of hydroxyl group of titanium oxide-chloride, bromcarboxyl, and hydroxyl group-chloride.

What is claimed is:

1. An electrochromic display device comprising:
   a pair of substrate electrodes; and
   an electrolyte solution interposed between the pair of substrate electrodes, wherein:
   one substrate electrode of the pair of substrate electrodes has a porous structure on its surface;
   a first electrochromic dye that has a functional group that is capable of adsorbing to the porous structure is adsorbed to the porous structure via the functional group of the first electrochromic dye; and
   a second electrochromic dye that has a functional group that is capable of chemically bonding to the first electrochromic dye is bonded to the first electrochromic dye via a chemical bond between the first electrochromic dye and the functional group of the second electrochromic dye.

2. The electrochromic display device of claim 1, further comprising a third electrochromic dye that has a functional group that is capable of bonding to the second electrochromic dye, and is bonded to the second electrochromic dye via the functional group of the third electrochromic dye.

3. The electrochromic display device of claim 2, wherein the second electrochromic dye causes a color change according to a pH change in the electrolyte solution in the vicinity of the electrode.

4. The electrochromic display device of claim 1, wherein the second electrochromic dye causes a color change according to a pH change in the electrolyte solution in the vicinity of the electrode.

5. The electrochromic display device of claim 1, wherein the functional group capable of adsorbing to the porous structure is a carboxyl group or a phosphoric acid salt.

6. The electrochromic display device of claim 1, wherein the functional group of the second electrochromic dye that is capable of chemically bonding to the first electrochromic dye is a hydroxyl group.

7. An electrochromic display device comprising:
   a pair of substrate electrodes; and
   an electrolyte solution interposed between the pair of substrate electrodes, wherein:
   one substrate electrode of the pair of substrate electrodes has a porous structure on its surface;
   a compound that has a functional group capable of adsorbing to the porous structure is disposed on the porous structure through the functional group in such a manner that the compound is chemically bonded with a fourth electrochromic dye or forms a clathrate with the fourth electrochromic dye.

8. The electrochromic display device of claim 7, wherein the functional group capable of adsorbing to the porous structure is a carboxyl group or a phosphoric acid salt.

9. The electrochromic display device of claim 7, wherein the fourth electrochromic dye causes a color change according to a pH change in the electrolyte solution in the vicinity of the electrode.

* * * * *